US008935752B1

(12) United States Patent
Chen et al.

(10) Patent No.: US 8,935,752 B1
(45) Date of Patent: Jan. 13, 2015

(54) SYSTEM AND METHOD FOR IDENTITY CONSOLIDATION

(75) Inventors: Shun Chen, Union City, CA (US); Richard Bruce Dandliker, Oakland, CA (US); Phillip DiCorpo, San Francisco, CA (US); Bruce Christopher Wootton, Alameda, CA (US); Dirk Kessler, San Francisco, CA (US); Timothy Micheal Wyatt, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 1420 days.

(21) Appl. No.: 12/409,449

(22) Filed: Mar. 23, 2009

(51) Int. Cl.
*G06F 11/00* (2006.01)
*H04L 29/06* (2006.01)
*G06F 12/14* (2006.01)
*G06F 12/16* (2006.01)

(52) U.S. Cl.
USPC .......... 726/4; 726/1; 726/22; 726/23; 726/24; 726/25

(58) Field of Classification Search
CPC ............ H04L 63/1416; H04L 63/1408; H04L 63/1433; G06F 21/552
See application file for complete search history.

(56) References Cited

U.S. PATENT DOCUMENTS

| 4,858,152 | A | 8/1989 | Estes |
| 5,212,821 | A | 5/1993 | Gorin et al. |
| 5,379,391 | A | 1/1995 | Belsan et al. |
| 5,384,892 | A | 1/1995 | Strong |
| 5,577,249 | A | 11/1996 | Califano |
| 5,615,277 | A * | 3/1997 | Hoffman ........................ 382/115 |
| 5,739,391 | A | 4/1998 | Ruppel et al. |
| 5,796,948 | A | 8/1998 | Cohen |
| 5,832,212 | A | 11/1998 | Cragun et al. |
| 5,835,722 | A | 11/1998 | Bradshaw et al. |
| 5,883,588 | A | 3/1999 | Okamura |
| 5,884,033 | A | 3/1999 | Duvall et al. |

(Continued)

FOREIGN PATENT DOCUMENTS

| CA | 2 499 508 | 4/2004 |
| CA | 2 597 083 | 8/2006 |

(Continued)

OTHER PUBLICATIONS

Office Action for U.S. Appl. No. 12/490,258 mailed Mar. 31, 2011.

(Continued)

*Primary Examiner* — Dede Zecher
*Assistant Examiner* — Trang Doan
(74) *Attorney, Agent, or Firm* — Lowenstein Sandler LLP

(57) ABSTRACT

A method and apparatus for identity consolidation for a plurality of electronic identities is described. In one embodiment, the method includes receiving user identification data extracted from an electronic communication, the user identification data corresponding to an unknown identity of a sender of the electronic communication. The method further includes determining a known identity for the sender using the user identification data extracted from the electronic communication and associating the known identity with the unknown identity of the sender of the electronic communication. In one embodiment, an association between the known identity and the unknown identity is maintained to determine whether parties of subsequent information transfers are authorized to participate in the information transfers.

17 Claims, 7 Drawing Sheets

(56) References Cited

U.S. PATENT DOCUMENTS

| | | | |
|---|---|---|---|
| 5,889,958 A | 3/1999 | Willens | |
| 5,892,905 A | 4/1999 | Brandt et al. | |
| 5,958,015 A | 9/1999 | Dascalu | |
| 5,960,080 A | 9/1999 | Fahlman et al. | |
| 5,996,011 A | 11/1999 | Humes | |
| 6,004,276 A | 12/1999 | Wright et al. | |
| 6,029,144 A | 2/2000 | Barrett et al. | |
| 6,047,283 A | 4/2000 | Braun | |
| 6,055,538 A | 4/2000 | Kessenich et al. | |
| 6,065,056 A | 5/2000 | Bradshaw et al. | |
| 6,073,142 A | 6/2000 | Geiger et al. | |
| 6,094,689 A | 7/2000 | Embry et al. | |
| 6,125,371 A | 9/2000 | Bohannon et al. | |
| 6,138,168 A | 10/2000 | Kelly et al. | |
| 6,233,618 B1 | 5/2001 | Shannon | |
| 6,256,631 B1 | 7/2001 | Malcolm | |
| 6,266,775 B1 | 7/2001 | Kamba | |
| 6,289,375 B1 | 9/2001 | Knight et al. | |
| 6,289,462 B1 | 9/2001 | McNabb et al. | |
| 6,314,190 B1 | 11/2001 | Zimmermann | |
| 6,321,224 B1 | 11/2001 | Beall et al. | |
| 6,347,087 B1 | 2/2002 | Ganesh et al. | |
| 6,347,374 B1 | 2/2002 | Drake et al. | |
| 6,347,376 B1 | 2/2002 | Attwood et al. | |
| 6,360,215 B1 | 3/2002 | Judd et al. | |
| 6,374,241 B1 | 4/2002 | Lamburt et al. | |
| 6,396,513 B1 | 5/2002 | Helfman et al. | |
| 6,442,607 B1 | 8/2002 | Korn et al. | |
| 6,442,686 B1 | 8/2002 | McArdle et al. | |
| 6,453,338 B1 | 9/2002 | Shiono | |
| 6,507,846 B1 | 1/2003 | Consens | |
| 6,539,430 B1 | 3/2003 | Humes | |
| 6,604,141 B1 | 8/2003 | Ventura | |
| 6,618,725 B1 | 9/2003 | Fukuda et al. | |
| 6,636,838 B1 | 10/2003 | Perlman et al. | |
| 6,639,615 B1 | 10/2003 | Majumdar et al. | |
| 6,701,314 B1 | 3/2004 | Conover et al. | |
| 6,711,579 B2 | 3/2004 | Balakrishnan | |
| 6,714,936 B1 | 3/2004 | Nevin, III | |
| 6,732,087 B1 | 5/2004 | Hughes et al. | |
| 6,738,908 B1 | 5/2004 | Bonn et al. | |
| 6,754,832 B1 | 6/2004 | Godwin et al. | |
| 6,768,986 B2 | 7/2004 | Cras et al. | |
| 6,769,032 B1 | 7/2004 | Katiyar et al. | |
| 6,778,979 B2 | 8/2004 | Grefenstette et al. | |
| 6,779,120 B1 | 8/2004 | Valente et al. | |
| 6,829,613 B1 | 12/2004 | Liddy | |
| 6,829,635 B1 | 12/2004 | Townshend | |
| 6,834,286 B2 | 12/2004 | Srinivasan | |
| 6,871,284 B2 | 3/2005 | Cooper et al. | |
| 6,941,466 B2 | 9/2005 | Mastrianni et al. | |
| 6,947,985 B2 | 9/2005 | Hegli et al. | |
| 6,965,886 B2 | 11/2005 | Govrin et al. | |
| 6,983,186 B2 | 1/2006 | Navani et al. | |
| 6,996,788 B2 | 2/2006 | Akiba et al. | |
| 7,000,154 B1 | 2/2006 | LeDuc | |
| 7,003,562 B2 | 2/2006 | Mayer | |
| 7,010,572 B1 | 3/2006 | Benjamin et al. | |
| 7,114,185 B2 | 9/2006 | Moore et al. | |
| 7,130,885 B2 | 10/2006 | Chandra et al. | |
| 7,146,402 B2 | 12/2006 | Kucherawy | |
| 7,162,738 B2 | 1/2007 | Dickinson, III et al. | |
| 7,191,252 B2 | 3/2007 | Redlich et al. | |
| 7,203,749 B2 | 4/2007 | Hiraga et al. | |
| 7,222,158 B2 | 5/2007 | Wexelblat | |
| 7,237,008 B1 | 6/2007 | Tarbotton et al. | |
| 7,237,267 B2 | 6/2007 | Rayes et al. | |
| 7,249,175 B1 | 7/2007 | Donaldson | |
| 7,320,004 B1 | 1/2008 | DeLuca et al. | |
| 7,437,304 B2 | 10/2008 | Barnard et al. | |
| 7,447,718 B2 * | 11/2008 | Orumchian et al. | 1/1 |
| 7,464,402 B2 | 12/2008 | Briscoe et al. | |
| 7,472,114 B1 | 12/2008 | Rowney et al. | |
| 7,516,492 B1 | 4/2009 | Nisbet | |
| 7,523,498 B2 | 4/2009 | Fellenstein et al. | |
| 7,685,626 B2 | 3/2010 | Malcolm | |
| 7,716,217 B2 | 5/2010 | Marston et al. | |
| 7,716,240 B2 | 5/2010 | Lim | |
| 7,725,732 B1 * | 5/2010 | Ballard | 713/186 |
| 7,756,843 B1 | 7/2010 | Palmer | |
| 7,774,363 B2 | 8/2010 | Lim | |
| 7,788,235 B1 | 8/2010 | Yeo | |
| 7,877,409 B2 | 1/2011 | Lim | |
| 7,882,560 B2 | 2/2011 | Kraemer | |
| 7,886,359 B2 | 2/2011 | Jones et al. | |
| 7,950,058 B1 * | 5/2011 | Rockwood | 726/23 |
| 7,996,373 B1 | 8/2011 | Zoppas | |
| 7,996,374 B1 | 8/2011 | Jones et al. | |
| 7,996,385 B2 | 8/2011 | Rowney | |
| 8,011,003 B2 | 8/2011 | Rowney | |
| 8,024,431 B2 | 9/2011 | Hoffman | |
| 8,041,719 B2 | 10/2011 | Rowney | |
| 8,051,187 B2 * | 11/2011 | Noy et al. | 709/229 |
| 8,065,739 B1 | 11/2011 | Bruening | |
| 8,131,745 B1 * | 3/2012 | Hoffman et al. | 707/766 |
| 8,141,148 B2 * | 3/2012 | Thomas et al. | 726/22 |
| 8,225,371 B2 | 7/2012 | Jones et al. | |
| 8,255,370 B1 | 8/2012 | Zoppas | |
| 8,312,553 B2 | 11/2012 | Rowney | |
| 8,561,179 B2 * | 10/2013 | Durfee et al. | 726/22 |
| 8,561,181 B1 * | 10/2013 | Hernacki et al. | 726/22 |
| 8,566,305 B2 | 10/2013 | Rowney | |
| 8,595,849 B2 | 11/2013 | Jones | |
| 2001/0027451 A1 | 10/2001 | Taguchi et al. | |
| 2001/0037324 A1 | 11/2001 | Agrawal et al. | |
| 2002/0010679 A1 | 1/2002 | Felsher | |
| 2002/0069098 A1 | 6/2002 | Schmidt | |
| 2002/0073313 A1 | 6/2002 | Brown et al. | |
| 2002/0093676 A1 | 7/2002 | Parry | |
| 2002/0120586 A1 | 8/2002 | Masaki et al. | |
| 2002/0129140 A1 | 9/2002 | Peled et al. | |
| 2002/0138579 A1 | 9/2002 | Goldberg | |
| 2002/0178228 A1 | 11/2002 | Goldberg | |
| 2002/0198766 A1 | 12/2002 | Magrino et al. | |
| 2002/0199095 A1 | 12/2002 | Bandini et al. | |
| 2003/0051026 A1 | 3/2003 | Carter et al. | |
| 2003/0093518 A1 | 5/2003 | Hiraga | |
| 2003/0167402 A1 | 9/2003 | Stolfo et al. | |
| 2004/0015719 A1 * | 1/2004 | Lee et al. | 713/201 |
| 2004/0039991 A1 | 2/2004 | Hopkins et al. | |
| 2004/0064731 A1 * | 4/2004 | Nguyen et al. | 713/201 |
| 2004/0088425 A1 | 5/2004 | Rubinstein et al. | |
| 2004/0185885 A1 * | 9/2004 | Kock | 455/466 |
| 2004/0187024 A1 | 9/2004 | Briscoe et al. | |
| 2004/0193910 A1 | 9/2004 | Moles | |
| 2004/0225645 A1 | 11/2004 | Rowney et al. | |
| 2005/0027723 A1 | 2/2005 | Jones et al. | |
| 2005/0039033 A1 | 2/2005 | Meyers et al. | |
| 2005/0060537 A1 | 3/2005 | Stamos et al. | |
| 2005/0081121 A1 | 4/2005 | Wedel et al. | |
| 2005/0086252 A1 | 4/2005 | Jones et al. | |
| 2005/0096048 A1 * | 5/2005 | Clare et al. | 455/433 |
| 2005/0132206 A1 | 6/2005 | Palliyil et al. | |
| 2005/0138110 A1 | 6/2005 | Redlich et al. | |
| 2005/0182765 A1 | 8/2005 | Liddy | |
| 2005/0193004 A1 | 9/2005 | Cafeo et al. | |
| 2005/0216771 A1 | 9/2005 | Malcolm | |
| 2005/0257267 A1 | 11/2005 | Williams et al. | |
| 2006/0005035 A1 * | 1/2006 | Coughlin | 713/182 |
| 2006/0005247 A1 | 1/2006 | Zhang et al. | |
| 2006/0143459 A1 | 6/2006 | Villaron et al. | |
| 2006/0184549 A1 | 8/2006 | Rowney et al. | |
| 2006/0224426 A1 | 10/2006 | Goossens | |
| 2006/0224589 A1 | 10/2006 | Rowney et al. | |
| 2006/0253597 A1 | 11/2006 | Mujica | |
| 2007/0011158 A1 | 1/2007 | Parikh | |
| 2007/0130255 A1 | 6/2007 | Wolovitz et al. | |
| 2007/0136788 A1 | 6/2007 | Monahan et al. | |
| 2007/0156897 A1 | 7/2007 | Lim | |
| 2007/0169182 A1 * | 7/2007 | Wolfond et al. | 726/7 |
| 2007/0179945 A1 * | 8/2007 | Marston et al. | 707/5 |
| 2007/0261099 A1 | 11/2007 | Broussard | |
| 2007/0300306 A1 | 12/2007 | Hussain | |
| 2008/0066150 A1 | 3/2008 | Lim et al. | |

(56) References Cited

U.S. PATENT DOCUMENTS

| | | | |
|---|---|---|---|
| 2008/0109870 A1* | 5/2008 | Sherlock et al. | 726/1 |
| 2008/0148357 A1* | 6/2008 | Chen et al. | 726/4 |
| 2008/0168135 A1 | 7/2008 | Redlich et al. | |
| 2008/0235760 A1 | 9/2008 | Broussard | |
| 2008/0263626 A1 | 10/2008 | Bainter et al. | |
| 2008/0276319 A1* | 11/2008 | Rittermann | 726/23 |
| 2009/0013399 A1 | 1/2009 | Cottrell et al. | |
| 2009/0037594 A1 | 2/2009 | Sever et al. | |
| 2009/0048997 A1 | 2/2009 | Manickam et al. | |
| 2009/0150721 A1 | 6/2009 | Kochar et al. | |
| 2009/0164574 A1* | 6/2009 | Hoffman | 709/204 |
| 2010/0031312 A1 | 2/2010 | Dixit | |
| 2010/0100963 A1* | 4/2010 | Mahaffey | 726/25 |
| 2010/0169970 A1 | 7/2010 | Stolfo et al. | |
| 2010/0251363 A1 | 9/2010 | Todorovic | |
| 2010/0332481 A1 | 12/2010 | Rowney | |

FOREIGN PATENT DOCUMENTS

| | | |
|---|---|---|
| GB | 2 343 030 A | 4/2000 |
| GB | 2466367 A | 6/2010 |
| JP | 2002-189643 | 5/2002 |
| JP | 2005-539334 | 12/2005 |
| JP | 2008-171101 | 7/2008 |
| JP | 2008-537195 | 9/2008 |
| JP | 2012-150816 | 12/2012 |
| WO | 2004/027653 | 4/2004 |
| WO | 2006088952 | 8/2006 |

OTHER PUBLICATIONS

Office Action for U.S. Appl. No. 12/490,258 mailed Dec. 6, 2011.
USPTO Notice of Allowance for U.S. Appl. No. 12/490,258 mailed Jun. 26, 2011.
Notice of Allowance Mailed Jan. 29, 2014.
Office Action for U.S. Appl. No. 10/607,718 mailed Feb. 10, 2006.
Office Action for U.S. Appl. No. 10/607,718 mailed Jun. 28, 2006.
Office Action for U.S. Appl. No. 10/607,718 mailed Nov. 15, 2006.
Office Action for U.S. Appl. No. 10/607,718 mailed Jul. 10, 2007.
Office Action for U.S. Appl. No. 10/607,718 mailed Jan. 8, 2008.
Office Action for U.S. Appl. No. 10/607,718 mailed Jul. 3, 2008.
Office Action for U.S. Appl. No. 10/607,718 mailed Nov. 14, 2008.
Office Action for U.S. Appl. No. 10/607,718 mailed May 1, 2009.
Office Action for U.S. Appl. No. 10/607,718 mailed Nov. 9, 2009.
Office Action for U.S. Appl. No. 10/607,718 mailed Apr. 12, 2010.
Office Action for U.S. Appl. No. 10/607,718 mailed Aug. 17, 2010.
Office Action for U.S. Appl. No. 10/607,718 mailed Feb. 3, 2011.
Notice of Allowance for U.S. Appl. No. 10/607,718 mailed Jun. 17, 2011.
USPTO Office Action for U.S. Appl. No. 13/246,774 mailed Dec. 7, 2012.
USPTO Office Action for U.S. Appl. No. 13/246,774 mailed Sep. 11, 2013.
USPTO Notice of Allowance for U.S. Appl. No. 13/246,774 mailed Jan. 29, 2014.
Office Action for U.S. Appl. No. 10/833,538 mailed Oct. 31, 2006.
Office Action for U.S. Appl. No. 10/833,538 mailed Jul. 23, 2007.
Office Action for U.S. Appl. No. 10/833,538 mailed Feb. 14, 2008.
Notice of Allowance for U.S. Appl. No. 10/833,538 mailed Aug. 6, 2008.
Notice of Allowance for U.S. Appl. No. 12/266,545 mailed Mar. 25, 2011.
Office Action for U.S. Appl. No. 12/632,620 mailed Dec. 7, 2011.
Office Action for U.S. Appl. No. 12/632,620 mailed Apr. 24, 2012.
USPTO Notice of Allowance for U.S. Appl. No. 12/632,620 mailed Jun. 10, 2013.
Office Action for U.S. Appl. No. 10/892,982 mailed Jan. 23, 2007.
Office Action for U.S. Appl. No. 10/892,982 mailed Sep. 17, 2007.
Office Action for U.S. Appl. No. 10/892,982 mailed Apr. 8, 2008.
Office Action for U.S. Appl. No. 10/892,982 mailed Oct. 27, 2008.
Office Action for U.S. Appl. No. 10/892,982 mailed Feb. 12, 2009.
Office Action for U.S. Appl. No. 10/892,982 mailed Jul. 20, 2009.
Office Action for U.S. Appl. No. 10/892,982 mailed Jan. 6, 2010.
USPTO Notice of Allowance for U.S. Appl. No. 10/892,982 mailed Dec. 6, 2010.
Office Action for U.S. Appl. No. 12/982,750 mailed Apr. 11, 2011.
Office Action for U.S. Appl. No. 12/982,750 mailed Sep. 7, 2011.
Office Action for U.S. Appl. No. 12/982,750 mailed Dec. 30, 2011.
USPTO Office Action for U.S. Appl. No. 12/982,750 mailed Dec. 30, 2011.
USPTO Office Action for U.S. Appl. No. 12/982,750 mailed Jul. 11, 2012.
USPTO Office Action for U.S. Appl. No. 12/982,750 mailed Apr. 2, 2012.
USPTO Notice of Allowance for U.S. Appl. No. 12/982,750 mailed Jul. 22, 2013.
Office Action for U.S. Appl. No. 10/892,615 mailed Apr. 27, 2007.
Office Action for U.S. Appl. No. 10/892,615 mailed Dec. 12, 2007.
Office Action for U.S. Appl. No. 10/892,615 mailed Apr. 21, 2008.
Office Action for U.S. Appl. No. 10/892,615 mailed Dec. 5, 2008.
Office Action for U.S. Appl. No. 10/892,615 mailed May 12, 2009.
Office Action for U.S. Appl. No. 10/892,615 mailed Mar. 24, 2010.
Advisory Action for U.S. Appl. No. 10/892,615 mailed Jul. 2, 2010.
Office Action for U.S. Appl. No. 10/892,615 mailed Nov. 16, 2011.
Notice of Allowance for U.S. Appl. No. 10/892,615 mailed Mar. 14, 2012.
Office Action for U.S. Appl. No. 13/532,660 mailed Apr. 11, 2013.
Office Action for U.S. Appl. No. 13/532,660 mailed Aug. 14, 2013.
Office Action for U.S. Appl. No. 13/352,660 mailed Feb. 3, 2014.
Notice of Allowance for U.S. Appl. No. 13/352,660 mailed Apr. 10, 2014.
USPTO; Office Action for U.S. Appl. No. 13/532,660, mailed Aug. 14, 2013.
Office Action for U.S. Appl. No. 11/057,988 mailed Aug. 18, 2008.
Office Action for U.S. Appl. No. 11/057,988 mailed Jan. 28, 2009.
Office Action for U.S. Appl. No. 11/057,988 mailed Jul. 10, 2009.
Office Action for U.S. Appl. No. 11/057,988 mailed Mar. 18, 2010.
Notice of Allowance for U.S. Appl. No. 11/057,988 mailed Mar. 18, 2010.
Office Action for U.S. Appl. No. 11/058,551 mailed Sep. 9, 2008.
Office Action for U.S. Appl. No. 11/058,551 mailed Mar. 20, 2009.
Office Action for U.S. Appl. No. 11/058,551 mailed Sep. 11, 2009.
Office Action for U.S. Appl. No. 11/058,551 mailed Mar. 8, 2010.
Office Action for U.S. Appl. No. 11/058,551 mailed Aug. 2, 2010.
Office Action for U.S. Appl. No. 11/058,551 mailed Apr. 11, 2011.
Office Action for U.S. Appl. No. 12/079,719 mailed Jan. 21, 2011.
Notice of Allowance for U.S. Appl. No. 12/079,719 mailed Jan. 21, 2011.
Office Action for U.S. Appl. No. 12/079,630 mailed Aug. 31, 2010.
Notice of Allowance Action for U.S. Appl. No. 12/079,630 mailed Mar. 24, 2011.
Office Action for U.S. Appl. No. 13/168,926, mailed Nov. 8, 2011.
Office Action for U.S. Appl. No. 13/168,926, mailed Jan. 25, 2012.
Notice of Allowance for U.S. Appl. No. 13/168,926, mailed Apr. 16, 2012.
Office Action for U.S. Appl. No. 12/079,660 mailed Aug. 19, 2010.
Office Action for U.S. Appl. No. 12/079,660 mailed Dec. 22, 2010.
Office Action for U.S. Appl. No. 12/079,660 mailed Mar. 31, 2011.
USPTO Office Action for U.S. Appl. No. 13/174,718 mailed Mar. 19, 2013.
USPTO Office Action for U.S. Appl. No. 13/174,718 mailed Jul. 22, 2013.
USPTO Office Action for U.S. Appl. No. 13/174,718 mailed Dec. 24, 2013.
Office Action for U.S. Appl. No. 12/409,449 mailed Mar. 12, 2012.
USPTO Office Action for U.S. Appl. No. 12/409,449 mailed Aug. 14, 2012.
Office Action for U.S. Appl. No. 12/409,449 mailed Apr. 18, 2014.
Office Action for U.S. Appl. No. 12/346,606 mailed Jun. 8, 2012.
Office Action for U.S. Appl. No. 12/346,606 mailed Dec. 14, 2012.
Office Action for U.S. Appl. No. 12/346,606 mailed May 29, 2014.
Office Action for U.S. Appl. No. 12/342,038 mailed May 3, 2011.
Office Action for U.S. Appl. No. 12/342,038 mailed Oct. 26, 2011.
Office Action for U.S. Appl. No. 12/342,038 mailed May 15, 2012.

(56) References Cited

OTHER PUBLICATIONS

Office Action for U.S. Appl. No. 12/342,038 mailed May 8, 2013.
USPTO; Notice of Allowance for U.S. Appl. No. 12/342,038, mailed Aug. 20, 2013.
Office Action for U.S. Appl. No. 12/395,554 mailed Nov. 23, 2011.
Office Action for U.S. Appl. No. 12/395,554 mailed Jan. 13, 2012.
Office Action for U.S. Appl. No. 12/395,554 mailed Aug. 8, 2013.
Office Action for U.S. Appl. No. 12/395,554 mailed Dec. 9, 2013.
Notice of Allowance for U.S. Appl. No. 12/395,554 mailed Apr. 24, 2014.
Office Action for U.S. Appl. No. 12/410,432 mailed Jul. 29, 2011.
Office Action for U.S. Appl. No. 12/410,432 mailed Dec. 16, 2011.
Alonso, Omar, et al, Oracle Secure Enterprise Search 10g, An Oracle Technical White Paper, Mar. 2006, 21 pages.
Attenex, Attenex Patterns Suite, http://www.attenex.com/products_services/attenex_patterns_suite.aspx, Downloaded Feb. 20, 2008, 2 pages.
Autonomy, Autonomy Group product overview, http://www.autonomy.com/content/products/index.en.html, Downloaded Feb. 20, 2008, 2 pages.
Autonomy, Security, http://www.autonomy.com/content/Technology/Technology_Benefits/security, Feb. 20, 2008, 2 pages.
Autonomy, Technology overview, http://www.autonomy.com/content/Technmology/index.en.html, Downloaded Feb. 20, 2008, 2 pages.
Autonomy, Limitations of Other Approaches, http://www.autonomy.com/content/Technology/Limitations_Other_Approaches, Downloaded Feb. 20, 2008, 2 pages.
Buchta, Stefan, Oracle Secure Enterprise Search Version 10.1.8.2, An Oracle Technical White Paper, Oct. 2007, 30 pages.
(CISCO) A Report From Ironport Systems , "Data Loss Prevention Best Practices—Managing Sensitive Data in the Enterprise", 2007, 21 pages.
Clearwell Systems, The Clearwell E-Discovery Platform®, http://www.clearwellsystems.com/products/e-discovery-platform, Downloaded Feb. 20, 2008 2 pages.
Clearwell Systems, The Clearwell E-Discovery Platform: Analysis, http://www.clearwellsystems.com/products/e-discovery-analysis.php, Downloaded Feb. 20, 2008, 1 page.
Clearwell Systems, The Clearwell E-Discovery Platform: Case Management, http://www.clearwellsystems.com/products/e-discovery-case-management, Downloaded Feb. 20, 2008 2 pages.
Clearwell Systems The Clearwell E-Discovery Platform: Processing, http://www.clearwellsystems.com/products/e-discovery-processing.php, Downloaded Feb. 20, 2008, 2 pages.
Clearwell Systems The Clearwell E-Discovery Platform: Review, http://www.clearwellsystems.com/products/e-discovery-review.php, Downloaded Feb. 20, 2008 2 pages.
Clearwell Systems The Clearwell E-Discovery Platform: Search &Cull-Down, http://www.clearwellsystems.com/products/e-discovery-search-cull.php, Downloaded Feb. 20, 2008 1 page.
Dale, et al., "Programming and Problem Solving with C++," 2002, Jones and Bartlett Publishers, 3rd Edition, pp. 653-662.
Deitel, et al., "C++-How to Program," 2001, Prentice Hall, 3rd Edition, pp. 273-279.
fast, Fast ESP Revitalizing your search experience with intelligent, user-centric search, 2007, Fast Search & Transfer ASA. , 6 pages.
Google, Google Search Appliance, http://www.google.com/enterprise/gsa/, Downloaded, Feb. 20, 2008, 2 pages.
Guidance Software, EnCase® eDiscovery Suite, http://www.guidancesoftware.com/products/ediscovery_index.aspx, Downloaded Feb. 20, 2008, 2 pages.
Kaufman, et al., "Network Security-Private Communication in a Public World," 1995, Prentice, Hall PTR, p. 80.
Koch, et al., "Oracle8—The Complete Reference," 1997, Osborn McGraw-Hill, pp. 9-7 and 51-62.
Krishnaprasad, Muralidhar, et al, Oracle Searching Enterprise Applications (Siebel 7.8 and E-Business Suite 11i) with Oracle Secure Enterprise Search 10.1.8, An Oracle White Paper, Jan. 2007, 25 pages.
Lupu, Emil et al. A Policy Based Role Object Model, EDOC '97 Proceedings, Pub Date 1997. Imperial College, Deparment of Computing, Relevant pp. 36-37.
Lymberopoulos, Leonidas et al., "An Adaptive Policy Based Management Framework for Differentiated Services Networks," Third International Workshop on Policies for Distributed Systems, 2002, Relevant pp. 147-158, <http://ieeexplore.ieee.org/stamp/stamp.jsp?tp=&arnumber=1011302>.
Manes et al., "A Framework for Redacting Digital Information from Electronic Devices", 2007, Retrieved from the internet <URL: ieeexplore.ieee.org/stamp/stamp.jsp?arnumber=04267542> pp. 1-5 as printed.
Menezes, et al. "Handbook of Applied Cryptography", 1997, p. 389.
Oracle Secure Enterprise Search 10G, Mar. 2006, 8 pages.
Oracle8TM Tuning, Release 8.0, Dec. 1997, Oracle®.
GB0921722.5 Search Report dated Mar. 26, 2010, 1 page.
PCT Search Report PCT/US03/30178 dated Mar. 11, 2004, 5 pages.
PCT Search Report PCT/US06/5317 dated Jul. 24, 2006, 5 pages.
Shapiro, William et al., "How to Manage Persistent State in DRM Systems," Aug. 2001, 12 pages, InterTrust Technologies Corporation, Santa Clara, CA.
White, Ron, "How Computers Work" Que Coporation, 6th Edition, 2002, pp. 12-15 and 304.
Web-Harvest Overview, Nov. 2006, Retrieved from the internet <URL:web.archive.org/web/20061130081756/http://web-harvest.sourceforge.net/overview.php> pp. 1-15 as printed.
Zantaz, Enterprise Archive Solution (EAS) Product family, Datasheet, 4 pages.
Office Action for U.S. Appl. No. 10/247,002 mailed Mar. 3, 2006.
Office Action for U.S. Appl. No. 10/247,002 mailed Aug. 21, 2006.
Office Action for U.S. Appl. No. 10/247,002 mailed Jan. 23, 2007.
Office Action for U.S. Appl. No. 10/247,002 mailed Sep. 17, 2007.
Office Action for U.S. Appl. No. 10/247,002 mailed Dec. 12, 2007.
Office Action for U.S. Appl. No. 10/247,002 mailed Jun. 18, 2008.
Office Action for U.S. Appl. No. 10/247,002 mailed Nov. 25, 2008.
Office Action for U.S. Appl. No. 10/247,002 mailed May 21, 2009.
Office Action for U.S. Appl. No. 10/247,002 mailed Dec. 31, 2009.
Notice of Allowance Action for U.S. Appl. No. 10/247,002 mailed Oct. 7, 2013.
Office Action for U.S. Appl. No. 10/431,145 mailed Oct. 23, 2006.
Office Action for U.S. Appl. No. 10/431,145 mailed Jul. 26, 2007.
Office Action for U.S. Appl. No. 10/431,145 mailed Feb. 25, 2008.
Notice of Allowance for U.S. Appl. No. 10/431,145 mailed Aug. 20, 2008.
Notice of Allowance for U.S. Appl. No. 10/431,145 mailed Jun. 5, 2009.

* cited by examiner

SYSTEM AND METHOD FOR IDENTITY CONSOLIDATION

FIELD OF INVENTION

Embodiments of the invention relate to the field of processing data, and more particularly, to identity consolidation for a plurality of electronic identities.

BACKGROUND OF THE INVENTION

A modern organization typically maintains a data storage system to store and deliver records concerning various significant business aspects of the organization. Stored records may include data on customers (or patients), contracts, deliveries, supplies, employees, manufacturing, or the like. A data storage system of an organization usually utilizes a tabular storage mechanism, such as relational databases, client/server applications built on top of relational databases (e.g., Siebel, SAP, or the like), object-oriented databases, object-relational databases, document stores and file systems that store table formatted data (e.g., CSV files or Excel spreadsheet files), password systems, single-sign-on systems, or the like.

Existing security techniques typically monitor messages sent by employees of an organization to outside recipients to prevent loss of sensitive information. However, users may utilize a wide range of different ways to transfer information with other users, utilize network resources, store data and information, and control information technology assets. Each of these different ways of transferring information is usually accompanied by an address or username. The existing security techniques are unable to monitor each of these with reference to user-specific policies.

SUMMARY OF THE INVENTION

A method and apparatus for identity consolidation for a plurality of electronic identities is described. In one embodiment, the method includes receiving user identification data extracted from an electronic communication, the user identification data corresponding to an unknown identity of a sender of the electronic communication. The method further includes determining a known identity for the sender using the user identification data extracted from the electronic communication and associating the known identity with the unknown identity of the sender of the electronic communication. In one embodiment, an association between the known identity and the unknown identity is maintained to determine whether parties of subsequent information transfers are authorized to participate in the information transfers.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
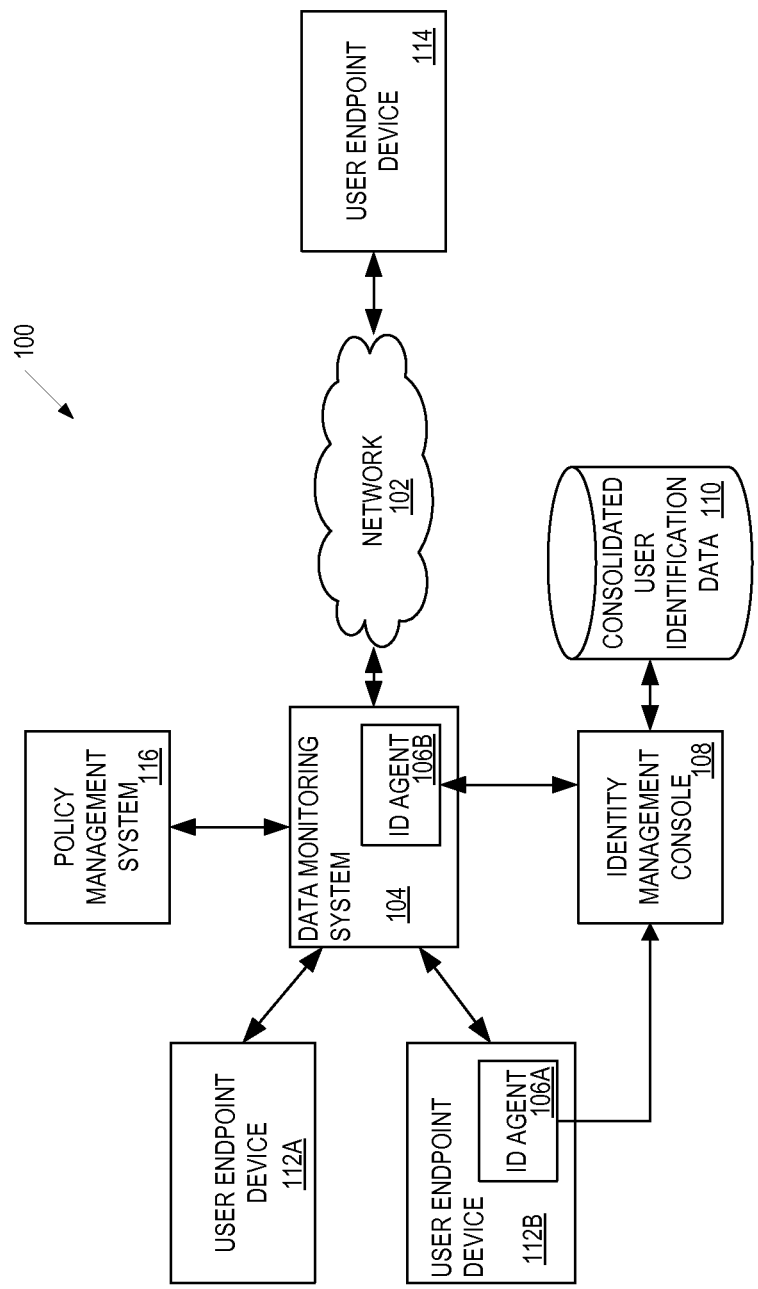
FIG. 1 is a block diagram of exemplary system architecture for consolidating identity data for a plurality of electronic identities of a user.

A system and method for identity consolidation for a plurality of electronic identities is described is described. User identification data, such as an email address, instant message handle, etc., may be extracted from electronic communications. Because communications techniques, such as web email, are typically not connected with electronic directory systems, the extracted user identification data corresponds to an unknown identity of a sender of the electronic communication. In one embodiment, a known identity is determined for the sender using the user identification data extracted from the electronic communication. The known identity may then be associated with the unknown identity of the sender of the electronic communication. Furthermore, an association between the known identity and the unknown identity is maintained to determine whether parties of subsequent information transfers are authorized to participate in the information transfers.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of exemplary system architecture 100 for consolidating identity data for a plurality of electronic identities of a user.

The system 100 includes an identity management console 108, a consolidated user identities database 110, a data monitoring system (DMS) 104, a policy management system (PMS) 116 and a plurality of user endpoint devices (e.g., user endpoint device 112A, 112B, and 114). They may be coupled to a computer network that communicates any of the standard protocols for the exchange of information. They may run on one Local Area Network (LAN) and may be incorporated into the same physical or logical system, or different physical or logical systems.

Alternatively, the identity management console 108, consolidated user identities database 110, DMS 104, PMS 116 and user endpoint devices (e.g., user endpoint device 112A, 112B, and 114) may reside on different LANs that may be coupled together via the Internet but separated by firewalls, routers, and/or other network devices. In yet another configuration, the identity management console 108 and PMS 104 may reside on a server, or different servers, coupled to other devices via a public network (e.g., the Internet) or a private network (e.g., LAN). It should be noted that various other network configurations can be used including, for example, hosted configurations, distributed configurations, centralized configurations, etc.

The user endpoint devices (e.g., user endpoint device 112A, 112B, and 114) are responsible for sending and receiving messages. Messages may represent a transmitted document (e.g., an email message, a web mail message, an instant message, a short message service (SMS) message, a multimedia message service (MMS) message, etc.) or data stored in databases, caches, etc. In one embodiment, user endpoint devices 112A, 112B, and 114 are client devices, such as, for example, personal computers, laptop computers, cellular telephones, personal digital assistants (PDAs), etc.

In one embodiment, some user endpoint devices, such as user endpoint device 112B are devices known by data monitoring system 104 or identity management console 108. In one embodiment, a device is a "known" device when it is part of an electronic directory system, such as a Microsoft Active Directory system or Lightweight Data Access Protocol (LDAP) system. These directory systems hold corporate email addresses, system login information (e.g., username and password), as well as related information about individuals in the corporation such as a business unit each individual belongs to, employee identification number, etc. Thus, when a user logs into such a machine with an assigned username and password (e.g., an electronic identity), messages sent to and from user endpoint device 112B may be presumed to have been generated by the logged-in user.

In one embodiment, some user endpoint devices, such as user endpoint device 112A are devices that are not "known" by data monitoring system 104 or identity management console 108. Although user endpoint device 112A is connected to a network and is enabled to send and receive messages that can be intercepted by data monitoring system 104, user endpoint device 112A is not a device that is part of an electronic directory system. For example, such a device may be a user's personal laptop that is connected to a network, a PDA connected to the corporate network, etc. Thus, these devices may have access to sensitive information, and be able to send and receive such information, while little is known about these devices.

The PMS 116 is responsible for receiving parameters pertaining to data loss prevention (DLP) policies, such as pre-configured template policies or customized policies, and creating policies based on these parameters. In one embodiment, the PMS 116 receives the policy parameters via a policy definition graphical user interface (not shown). In another embodiment, the PMS 116 receives the policy parameters from an Application Programming Interface (API) or via a configuration file formatted in text or a defined data format (e.g., extensible markup language (XML) or binary format).

The PMS 116 may create policies based on regulations concerning handling of sensitive information maintained by an organization, or based on corporate data governance rules. The regulations may include, for example, the Health Insurance Portability and Accountability Act (HIPAA) ensuring the confidentiality of electronic protected health information, California Senate Bill 1 (SB1) or Senate Bill 1386 (SB1386) controlling customer information leaving the company and affiliates, the Gramm-Leach-Bliley Financial Services Modernization Act controlling customer information leaving a financial institution, the Cardholder Information Security Program (CISP) controlling handling of customer credit card information maintained by an organization, or the like. In one embodiment, the PMS 116 may use policy templates or customized policies pre-configured based on input provided by individuals familiar with the relevant regulations or corporate data governance rules.

A policy may include a set of rules that specify which information should be present in a message to trigger a violation. For example, a message may represent a transmitted document (e.g., an email message, a web mail message, etc.) or data stored in databases, caches, etc. The set of rules may provide specific conditions for triggering a violation (e.g., a sender or recipient of a message, inclusion in a message of a keyword(s) or regular expression pattern, etc.). The rules in the policy may be combined using logical connectives of first-order logic (e.g., AND, OR, NAND, NOR, NOT, equivalent, nonequivalent, or the like).

In one embodiment, a policy specifies source data that should be protected from unauthorized transmission, access or any other use. The source data may be stored in a tabular format (e.g., data in a relational database, data maintained by client/server applications built on top of relational databases, data in document and file systems that store table formatted data (e.g., CSV files or Excel spreadsheet files), etc.) or it may be stored in a non-tabular format but convertible to a tabular format (e.g., data stored as comma separated values in a flat file, a password database or a single-sign-on system, relational data in an object-oriented database, etc.). The policy may also specify which portions of the source data 102 should be included in a message to trigger a policy violation.

In one embodiment, the PMS 116 creates an index of the source data. In one embodiment, the index is in the form of an abstract data structure that includes signatures of data elements of the source data and placement information of each data element within the source data. The signature may be an encrypted or hashed copy of the data element or some other representation of the data element that would not allow a malicious user to recover the actual content of the data element. The placement information may include the number of a row storing the data element in the source data and/or the number of a column storing the data element in the source data. Optionally, the placement information may also include the data type of the column. The signatures and placement information may be stored in a tuple-storage structure derived from the source data. A tuple-storage structure provides a mechanism for storing multiple tuples associated with the elements of the source data. Examples of tuple-storage structures include a hash table, a vector, an array, a tree or a list. Each type of the tuple-storage structure is associated with a method for retrieving a set of tuples for any given content element (the set of tuples may be empty if no match is found in the tuple-storage structure). The abstract data structure may be created periodically and sent to the DMS 104, along with the policy that is to be implemented.

The DMS 104 is responsible for monitoring information content (e.g., sent email messages, instant messages, text messages, and/or other documents according to a configuration of the DMS 104) to detect policy violation incidents. In one embodiment, the DMS detects policy violation incidents using the policies supplied by the PMS 116 and the source data index created by the PMS 116. Once the DMS 104 has detected a policy violation, the DMS 108 reports the policy violation to an appropriate entity (e.g., a manager, database administrator, a reporting system, etc.) or performs some other action.

In one embodiment, user endpoint device 112B hosts identification (ID) agent 106A that is responsible for monitoring messages and extracting user identification data from the messages. For example, when user endpoint device 112B sends an email message from a corporate email address, ID agent 106A extracts a username, email address, etc. associated with the message. Furthermore, when non-corporate forms of communication are used (such as instant messaging, a web email, etc.), ID agent is responsible for extracting identification information, such as an IM handle, web email address, etc. associated with the message. In one embodiment, the extracted information is associated with an individual responsible for sending the message. Furthermore, because user endpoint device 112B is a "known" device (e.g., a device that is logged into an electronic directory system), both public identification information (e.g., information that is part of the electronic directory system) and private identification information (e.g., an IM handle, web email address, etc.) can be extracted from messages sent to and from user endpoint device 112B. The extracted identification information is then transmitted to Identity Management Console 108 to consolidate user identity data, as discussed in greater detail below.

In one embodiment, the DMS 104 hosts ID agent 106B that is also responsible for monitoring messages and extracting user identification data from the messages sent by any of user endpoint device 112A, 112B, or 114. However, unlike ID agent 106A, ID agent 106B cannot associate private identification information (e.g., an IM handle, web email address, etc.) extracted from the messages with public identification information (e.g., information that is part of the electronic directory system) of the same users. For example, ID agent 106B may extract identification information from electronic messages sent by user endpoint device 112A which may be a user's private laptop computer, not logged into an electronic directory system with a corporate assigned username and password. Rather user endpoint device 112A may have network access from which it sends and receives messages. ID agent 106B extracts identification information from messages transmitted by user endpoint device 112A and sends the extracted identification information to Identity Management Console 108 to consolidate user identity data, as discussed in greater detail below.

Identity management console 108 is responsible for consolidating user identification data in order to create a global identity for users of an electronic directory system. The consolidated user identity data is stored in consolidated user identities database (DB) 110. A consolidated, or global, user identity may be considered as composed of two types of user identity data: known user identity data and correlated identity data. For example, when a user logs into an electronic directory system with a given name and password, an identity known to the electronic directory system is used. However, when a user then sends email messages from his or her private email account (e.g., a YAHOO™, GOOGLE™, etc. email account), which is not affiliated with the electronic directory system, the sender's identity is unknown for policy enforcement purposes, data loss prevention, tracking, etc.

In one embodiment, identity management console 108 correlates a user's known identity (e.g., an assigned login and password, user endpoint device identification, etc.) with identification data extracted from various types of electronic communications. Once a known identity and unknown identification data are correlated, both identities can be consolidated into a data record representing a user's global identity. For example, when John Doe logs into his work computer, sends an instant message with the IM handle JD, and sends an email from JD@YAHOO, the IM handle and private email address are correlated with John Doe's known identity. Thus, DMS 104 and PMS 116 may enforce policies, with respect to messages transmitted via John Doe's personal accounts (e.g., JD@YAHOO and the IM handle). The identification data, and messaging types discussed above are merely exemplary, as any type of messaging system that uses a user's identity may be correlated with a user.

Therefore, identity information about multiple personal user communications accounts, such as webmail addresses (e.g., YAHOO! MAIL™, GMAIL™, HOTMAIL™, etc.), instant messaging address user names (e.g., YAHOO INSTANT MESSANGER™, AOL INSTANT MESSANGER™, MSN MESSENGER™, etc.), etc. may be linked to known identities, such as a corporate identity. Because a large portion of inadvertent and malicious data loss events often involve sending information to and from personal communications accounts, collecting and correlating different types and parameters for user's personal identities is highly beneficial. For example, personal communications accounts could be blocked altogether, but many organizations are not willing to take this step because of potential negative reactions from employees. By using correlated identities, as described herein, organizations are able to enforce security, data loss, and usage policies, with minimal impact to employees.

Figure 2:
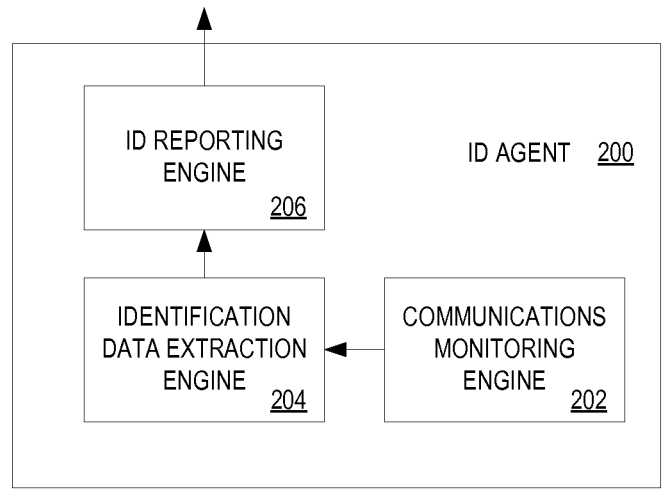
FIG. 2 is a block diagram of one embodiment of an ID agent.

FIG. 2 is a block diagram of one embodiment of an ID agent 200. The ID agent 200 may include a communications monitoring engine 202, identification extraction engine 204, and an ID reporting engine 206. In one embodiment, ID agent 200 may be deployed on both DMS 104 and user endpoint device 112B, discussed above in FIG. 1. However, in an alternate embodiment, an ID agent 200 may be configured specifically for deployment on one of DMS 104 or user endpoint device 112B.

The communications monitoring engine 202 monitors the transmission of electronic communications (e.g., email messages, web email messages, instant messages, text messages, etc.). In one embodiment, communications monitoring engine 202 monitors outgoing messages. In another embodiment, communications monitoring engine 202 monitors incoming messages or both outgoing and incoming messages. Communications monitoring engine 202 notifies identification data extraction engine 204 when communications monitoring engine 202 detects an electronic communication. In one embodiment, the electronic communication may be any of a corporate email, web email, instant message, social networking message, SMS message, MMS message, etc.

The identification data extraction engine 204 is responsible for extracting identification data from an electronic communication in response to notification from communications monitoring engine 202. In one embodiment, identification data extraction engine 204 parses the electronic communication to locate and extract the identification data. For example, identification data extraction engine 204 may parse an instant message to determine an IM handle responsible for sending a message. In one embodiment, the identification data extraction engine 204 also extracts additional identity data corresponding to an electronic communication. For example, when user endpoint device 112B sends a web email message, identification data extraction engine 204 extracts information relating to the user endpoint device 112B (e.g., a user's login, password, internet protocol address, machine name, etc.) from which the message was sent.

Identification data extraction engine 204 forwards the extracted identification information to ID reporting engine 206.

ID reporting engine 206 is responsible for sending reports, containing the extracted identification data, to the identity management console. In one embodiment, the ID reporting engine 206 transmits reports each time ID information is extracted from an electronic communication. In another embodiment, ID reporting engine 206 stores ID data and periodically transmits batches of extracted identification information.

Figure 3:
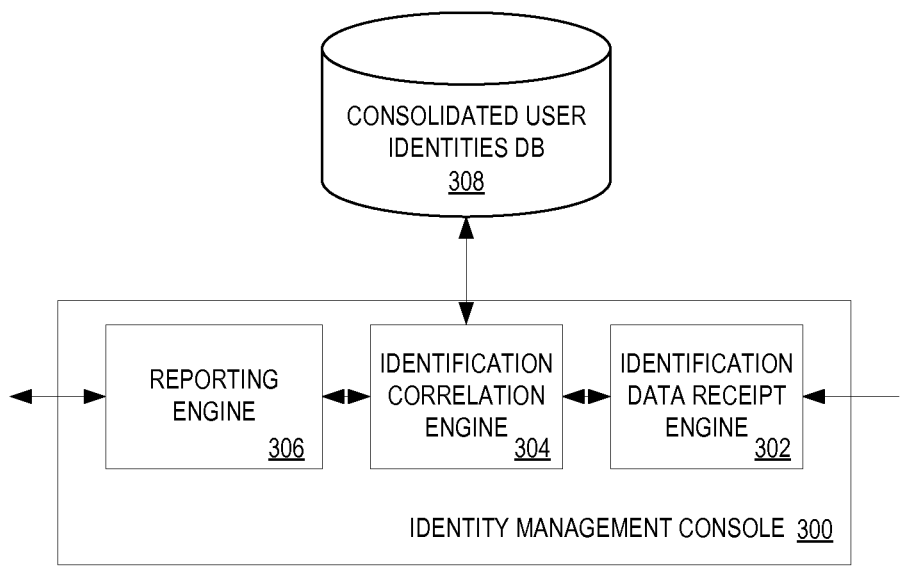
FIG. 3 is a block diagram of one embodiment of an identity management console.

FIG. 3 is a block diagram of one embodiment of an identity management console 300. The identity management console 300 may include an identification data receipt engine 302, an identification correlation engine 304, and a reporting engine 306. In one embodiment, identity management console 300 also includes a consolidated user identities database (DB) 308. In another embodiment, identity management module 300 communicates with consolidated user identities DB 308 (e.g., via a network).

Identification data receipt engine 302 is responsible for receiving reports of identification data from ID agents, such as ID agents 106A, 106B, and 200. Identification data receipt engine 302 forwards received reports to identification correlation engine 304.

Identification correlation engine 304 is responsible for correlating known identities with unknown identities and consolidating the results in consolidated user identities DB 308. In one embodiment, where an ID report consists of both known identification data (e.g., an electronic directory system assigned user ID, IP address, machine name, etc.) and unknown identification data (e.g., an IM handle, web email address, social/professional networking user name, etc.), identification correlation engine 304 associates known identification data with the unknown identification data. For example, if an ID report specifies that an electronic communication in the form of a web email sent by ANONYMOUS@YAHOO was submitted from a machine j_doe (e.g., a username known to, and assigned by, a corporate directory system) is currently logged into, j_doe can thereafter be associated with the personal email address ANONYMOUS@YAHOO. Thus, applications such as policy enforcement systems, data loss prevention systems, network resource tracking, etc. may monitor and/or handle electronic communication sent by ANONYMOUS@YAHOO as having been sent by j_doe. Identification correlation engine 304 stores the correlation in consolidated user identities DB 308 thereby creating a consolidated identity for the user j_doe.

In one embodiment, where an ID report consists of unknown identification data (e.g., an IM handle, web email address, social/professional networking user name, etc.), identification correlation engine 304 queries consolidated user identities DB 308. When a record exists with the unknown identification data identification, correlation engine 304 updates the database with the new occurrence. In one embodiment, when there is no record with the unknown identification data in the database 308, correlation engine 304 stores a record with unknown identification data separately (e.g., in a separate "suspension" table). Subsequently, when correlation engine 304 adds new identification data to the consolidation user identities DB 308, correlation engine 304 checks the suspension table for a record with matching identification data. If such a record is found, correlation engine 304 adds any other identifiers from the same record in the suspension table to the consolidation user identities DB 308, and removes this record from the suspension table.

In one embodiment, an identity will not be available in consolidated user identities DB 308 for identification correlation engine 304 to correlate with known identification data. For example, a data thief could log onto a shared system that makes use of generic names/passwords (e.g., a shared research laboratory network, computer commons, unsecured Wi-Fi access point, etc.). Furthermore, a confidence level for a consolidated user identity may be relatively low. In these situations, a consolidated user identity may be established via physical and/or forensic evidence. For instance, if correlated internet identities cluster around list of known systems at known times, examining access logs from other systems or interviewing individuals may lead to establishment of a corporate identity. In one embodiment, identity management console 300 receives (e.g., via identity management console 108 of FIG. 1) known user identification data that has been obtained from physical and/or forensic investigation. Thus, identification correlation engine 304 may thereafter utilize the known identification data to correlate previously unknown or anonymous identities.

In one embodiment, identification correlation engine 304 further correlates groupings of unknown user identities, which either cannot or have not yet been correlated with a known corporate identity. For example, identification correlation engine 304 may correlate three recurring unknown identities in consolidated user identities DB 308 that are responsible for data leakage. By correlating unknown identities, identification correlation engine 304 responses to reporting engine 306 may be generated without (yet) having a known corporate identity associated with the consolidated unknown identities. In one embodiment, unknown identities are correlated by identification correlation engine 304 to enable policy enforcement against the unknown identity(s).

Reporting engine 306 is responsible for responding to and sending reports concerning user identities. In one embodiment, when an ID agent (e.g., ID agent 106B of FIG. 1) detects an electronic communication, a corresponding system (e.g., DMS 104 of FIG. 1, a DLP system configured with an ID agent, a resources tracking system or application configured with an ID agent, etc.) may issue a request to know the true identity associated with the electronic communication from an unknown identity. Reporting engine 306 receives such requests, and queries identification correlation engine whether the unknown identity exists in any consolidated identity records. When the unknown identity exists, reporting engine 306 responds with the true/known identity. Otherwise reporting engine 306 responds that the identity is unknown. In one embodiment, reporting engine 306 further responds with a correlated grouping of unknown identities. In one embodiment, by responding that identities are unknown and/or belong to a grouping of recurring unknown identities, reporting engine 306 enables policy enforcement directed at unknown identity(s), such as more stringent policies for unknown identities or complete blocking of internet access for recurring and correlated unknown identities. Continuing the example above, reporting engine 306 may receive a request concerning an instant message sent by the IM handle ANON_JD. Based on consolidated identity data stored in consolidated user identities DB 308, reporting engine 306 may respond that ANON_JD is associated with the identity for j_doe to reveal the identity of the sender.

Figure 4:
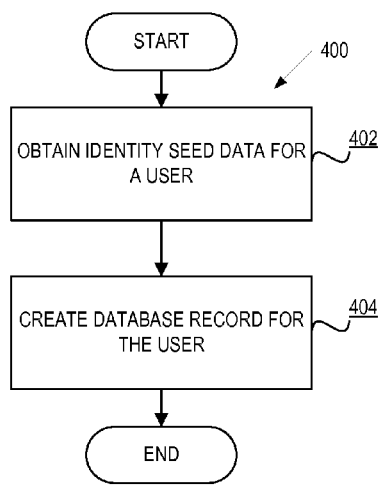
FIG. 4 is a flow diagram of one embodiment of a method for initializing a consolidated user identity record.

FIG. 4 is a flow diagram of one embodiment of a method 400 for initializing a consolidated user identity record. The method 400 is performed by processing logic that may comprise hardware (circuitry, dedicated logic, etc.), software (such as is run on a general purpose computer system or a dedicated machine), or a combination of both. In one embodiment, the method 400 is performed by an identity management console (e.g., identity management console 108).

Referring to FIG. 4, processing logic begins with obtaining identity seed data for a user (processing block 402). Seed data is identification data known about a user prior to the sending or receiving of an electronic communications. In one embodiment, the seed data is data stored in an electronic directory system (e.g., an Active Directory or LDAP directory), such as the user's assigned login name, password, employee number, assigned IP address, etc. Processing logic then creates a database record for the user (processing block 404). In one embodiment, the database record is an entry in a database table for multiple users. Furthermore, each record may be dynamically sized to permit the storage of a plurality of correlated IDs. In one embodiment, as discussed above and as will be discussed in greater detail below, the seed/known data and database record forms the basis of a consolidated user identity.

Figure 5A:
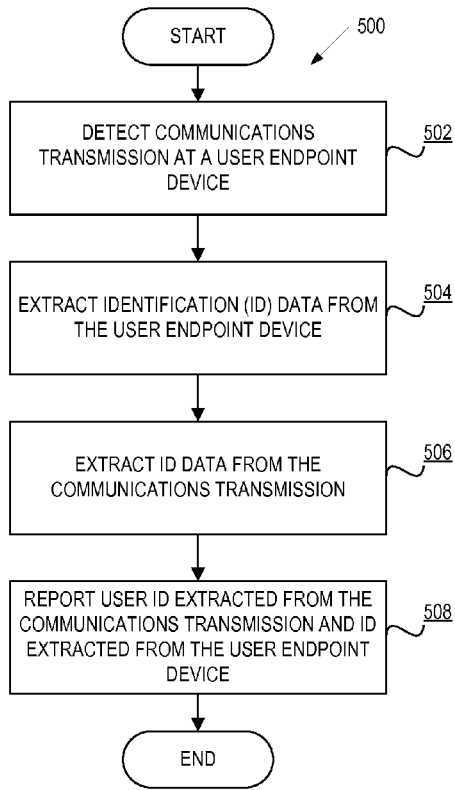
FIG. 5A is a flow diagram of one embodiment of a method for extracting and communicating identification data.

FIG. 5A is a flow diagram of one embodiment of a method 500 for extracting and communicating identification data. The method 500 is performed by processing logic that may comprise hardware (circuitry, dedicated logic, etc.), software (such as is run on a general purpose computer system or a dedicated machine), or a combination of both. In one embodiment, the method 500 is performed by an ID agent (e.g., ID agent 106A).

Referring to FIG. 5A, processing logic begins with detecting an electronic communications transmission at a user endpoint device (block 502). In one embodiment, the user endpoint device may be any of a personal computer, laptop computer, personal digital assistant, cellular telephone, etc. Because the user endpoint device may be any of the devices noted above, the electronic communications transmission may be an email message, web email message, instant message, SMS message, MMS message, etc.

Processing logic extracts identification (ID) data from the user endpoint device (processing block 504). In one embodiment, processing logic extracts the user name associated with a user currently logged into the endpoint device, the endpoint device's IP address (or other networking address), telephone number, etc. Processing logic also extracts ID data from the communications transmission (processing block 506). As discussed above, processing logic parses the electronic communication to determine identification data (e.g., an email address, IM handle, etc.) associated with the electronic communication.

Processing logic reports the ID data extracted from the electronic communication and the user endpoint device (processing block 508). In one embodiment, the report is directed to an identity management console, such as identity management console 108.

Figure 5B:
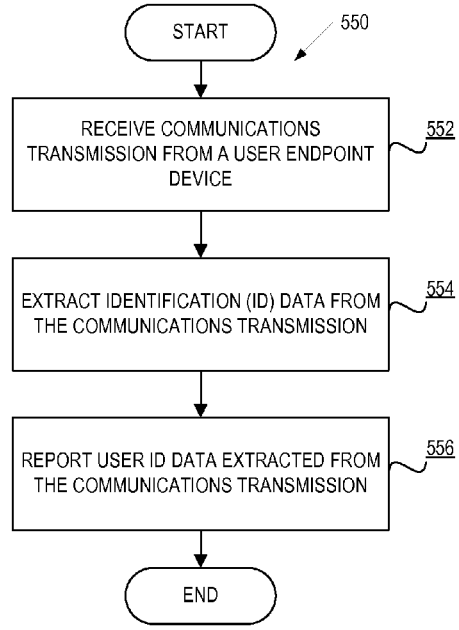
FIG. 5B is a flow diagram of one embodiment of a method for extracting and communicating identification data.

FIG. 5B is a flow diagram of one embodiment of a method 550 for extracting and communicating identification data. The method 550 is performed by processing logic that may comprise hardware (circuitry, dedicated logic, etc.), software (such as is run on a general purpose computer system or a dedicated machine), or a combination of both. In one embodiment, the method 550 is performed by an ID agent (e.g., ID agent 106B).

Referring to FIG. 5B, processing logic receives an electronic communications transmission from a user endpoint device (block 552). The electronic communication may be an email message, web email message, instant message, social/professional networking message, etc. In one embodiment, the message is received at a DMS 104 which is monitoring electronic communications sent from a plurality of user endpoint devices. However, other systems, such as data loss prevention systems, usage tracking systems, etc. configured with an ID agent 106B may also receive and handle messages, as discussed herein.

Processing logic extracts identification data from the electronic communications transmission (processing block 554). In one embodiment, the electronic communication is parsed to determine identification data, such as the sender's name of an email, IM handle of an instant message, login name for a social/professional networking message, etc.

Processing logic reports the identification data extracted from the electronic communications transmission (processing block 556). In one embodiment, the report is directed to an identity management console, such as identity management console 108.

Figure 6:
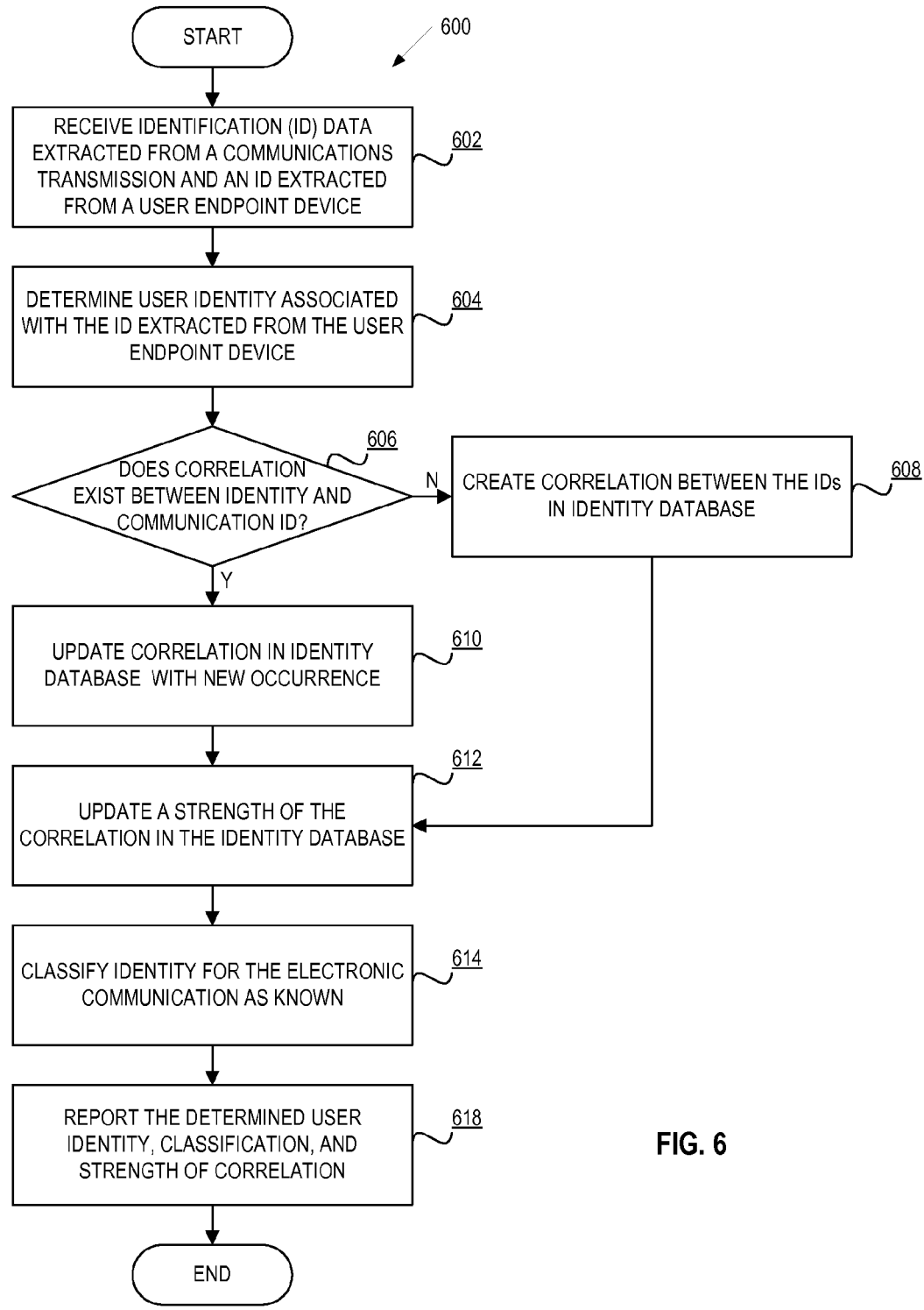
FIG. 6 is a flow diagram of one embodiment of a method for correlating identification data with user identities.

FIG. 6 is a flow diagram of one embodiment of a method 600 for correlating identification data with user identities. The method 600 is performed by processing logic that may comprise hardware (circuitry, dedicated logic, etc.), software (such as is run on a general purpose computer system or a dedicated machine), or a combination of both. In one embodiment, the method 600 is performed by an identity management console (e.g., identity management console 108).

Referring to FIG. 6, processing logic receives identification (ID) data extracted from a communications transmission and an ID extracted from a user endpoint device (block 602). In one embodiment, the data is received from a user endpoint device configured with an ID agent, such as user endpoint device 112B.

Processing logic determines a user identity associated with the ID extracted from the user endpoint device (processing block 604), and determines whether a correlation exists between the user identity and the ID extracted from the electronic communication (processing block 606). If a correlation does exist, processing logic updates the correlation in an identity database with the new occurrence. If no correlation exists, processing logic creates a correlation between the user identity and the extracted identification data (processing block 608). In one embodiment, processing logic updates records in a consolidated user identities database, such as consolidated user identities database 110. For example, processing logic may receive a user's assigned login and an IM handle extracted from an instant message. Processing logic then either creates a correlation between the user's consolidated identity and the IM handle, or updates an existing correlation.

In one embodiment, processing logic updates a strength of the correlation in the identity database (processing logic 612). The strength may indicate such factors as how often a correlation between a user identity and the extracted identification data occurs, how many times the correlation has been detected, whether the correlation conditions are similar to other occurrences (e.g., a user name correlation is detected but from different IP addresses), etc. By updating a measure of strength, additional guarantees of trustworthiness are provided by the consolidated user identity. That is, a correlation that has been detected 100 times may be trusted more readily than a correlation that has only been detected twice. Thus, systems, such as policy enforcement systems, data loss prevention system, usage tracking systems, etc. may factor the strength of the correlation into their own actions.

Processing logic classifies the electronic communication ID as known (e.g., a correlation between a known identity and the communication's ID exists) (processing block 614), and reports the determined user identity, classification, and strength of correlation (processing block 616). In one embodiment, the report is transmitted to DMS responsible for monitoring electronic messages, a data loss prevention system responsible for preventing inadvertent loss of sensitive information, a risk management system, an IT usage tracking system, etc.

Figure 7:
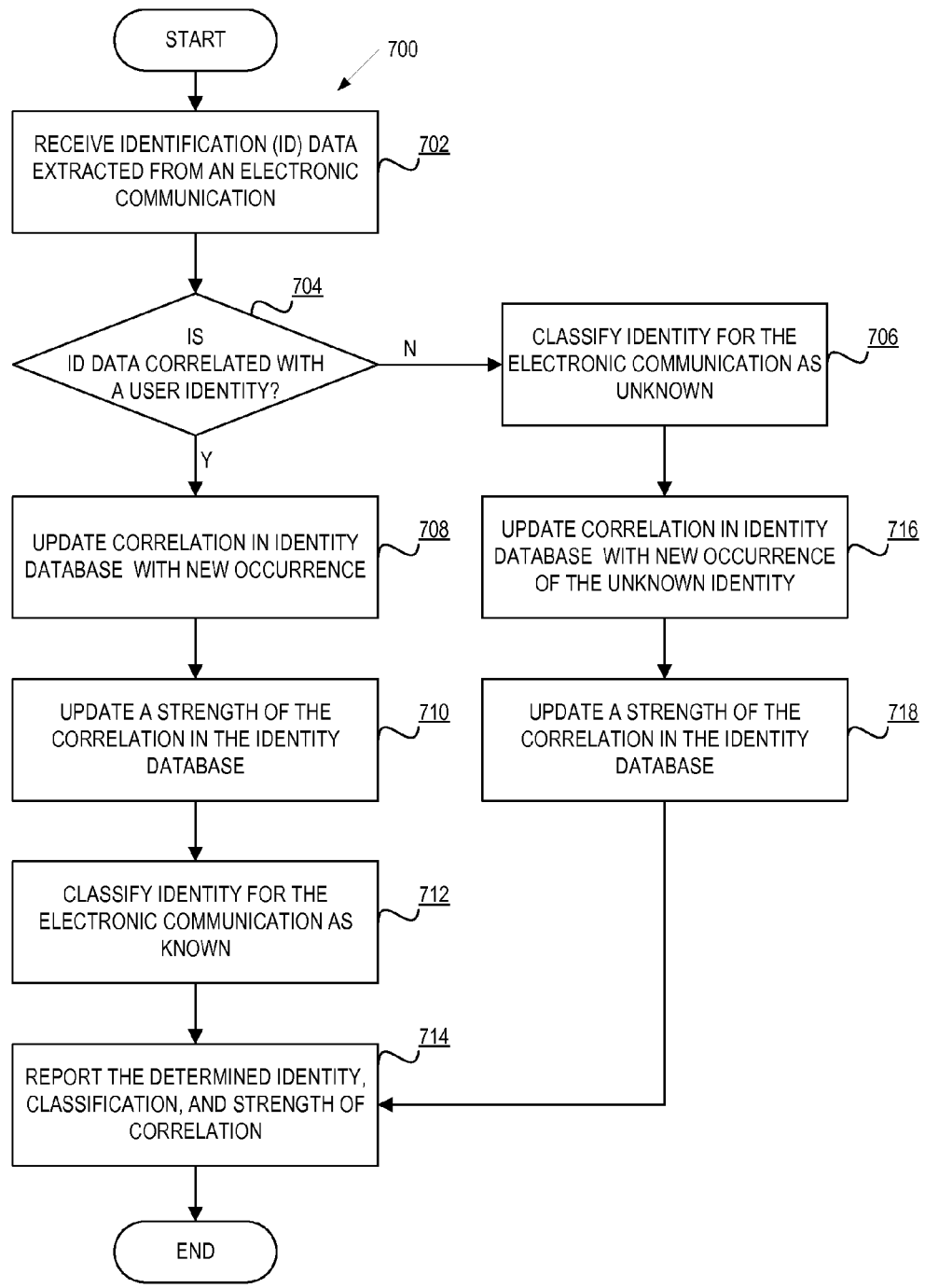
FIG. 7 is a flow diagram of one embodiment of a method for correlating identification data with user identities.

FIG. 7 is a flow diagram of one embodiment of a method 700 for correlating identification data with user identities. The method 700 is performed by processing logic that may comprise hardware (circuitry, dedicated logic, etc.), software (such as is run on a general purpose computer system or a dedicated machine), or a combination of both. In one embodiment, the method 700 is performed by an identity management console (e.g., identity management console 108).

Referring to FIG. 7, processing logic receives identification (ID) data extracted from a communications transmission (block 702). In contrast to FIG. 6, discussed above, an ID extracted from a user endpoint device is not received along with the extracted ID data.

Processing logic determines whether a correlation exists for the ID extracted from the electronic communication (processing block 704). If a correlation does exist (e.g., the extracted ID is associated with an existing user identity), processing logic updates the correlation and strength in an identity database with the new occurrence (processing blocks 708 and 710). Processing logic further classifies the identity for the electronic communication as known (processing block 712).

If no correlation exists, processing logic classifies the identity associated with the electronic communication as unknown (processing block 706). That is, since processing logic did not receive known identification data, and no correlations currently exist for the extracted ID, the extracted ID remains unknown. In one embodiment, as discussed above, unknown identities, as well as grouping of unknown identities and/or recurring unknown identities, are also correlated in identity database with the new occurrence and a strength of the correlation updated (processing blocks 716 and 718).

Processing logic reports the determined identity (if known), classification, and strength of correlation (processing block 714). In one embodiment, the report is transmitted to a DMS responsible for monitoring electronic messages, a data loss prevention system responsible for preventing inadvertent loss of sensitive information, a risk management system, an IT usage tracking system, etc.

Figure 8:
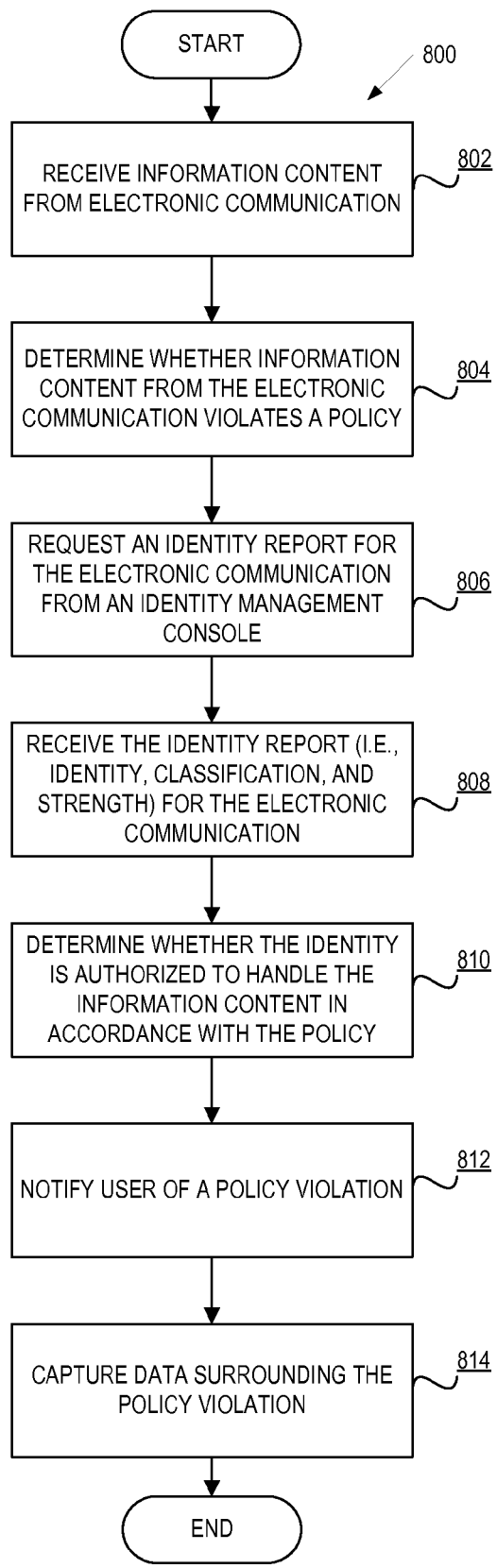
FIG. 8 is a flow diagram of one embodiment of a method for utilizing a consolidated identity.

FIG. 8 is a flow diagram of one embodiment of a method 800 for utilizing a consolidated identity. The method 800 is performed by processing logic that may comprise hardware (circuitry, dedicated logic, etc.), software (such as is run on a general purpose computer system or a dedicated machine), or a combination of both. In one embodiment, the method 800 is performed by the system of FIG. 1.

Referring to FIG. 8, processing logic receives information content from an electronic communication (processing block 802). In one embodiment, the received information may include free-form text and may be a file (e.g., an archived email message stored on a hard drive of a computer) or a block of data transmitted over a network (e.g., an email message, instant message, social/professional networking message, etc. transmitted over a network using any type of a network protocol). In one embodiment, the electronic communication is from a personal communications channel, such as a web email account (e.g., YAHOO! MAIL™), an instant message (e.g., AOL INSTANT MESSANGER™), text message, etc.

Processing logic determines whether the information content violates a policy (processing block 804). In one embodiment, the policy also specifies one or more rules regarding the identity of a party associated with the information content (e.g., whether a particular sender is allowed to send, or a particular recipient is allowed to receive, information content that includes sensitive data protected by the policy).

Processing logic requests an identity report for the electronic communication from an identity management console (processing block 806) and receives the identity report (processing block 808). In one embodiment, the report includes a user identity corresponding to the identification data extracted from the electronic communication and correlated with the user identity. In one embodiment, the identity report further includes a classification (e.g., whether the identity is known or unknown) and strength of the identity correlation.

Processing logic determines whether the parties associated with the information content from the electronic communication are authorized to handle (e.g., send, receive, copy, etc.) this information content in accordance with the relevant policy (processing block 810). Processing logic notifies a user, or other appropriate entity, when there is a policy violation (processing block 812).

Processing logic further captures data surrounding the policy violation (processing block 814). In one embodiment, processing logic captures a time when the policy violation occurred, the correlated identity for a user responsible for the policy violation, etc.

Accordingly, method 800 allows sensitive information to be protected from unauthorized use (e.g., transmission, access, etc.). Furthermore, because unknown identification data for electronic communications is extracted and correlated with a known identity, the policy may be enforced irrespective of how the electronic communication is transmitted, or from which computer an electronic communication was sent.

Figure 9:
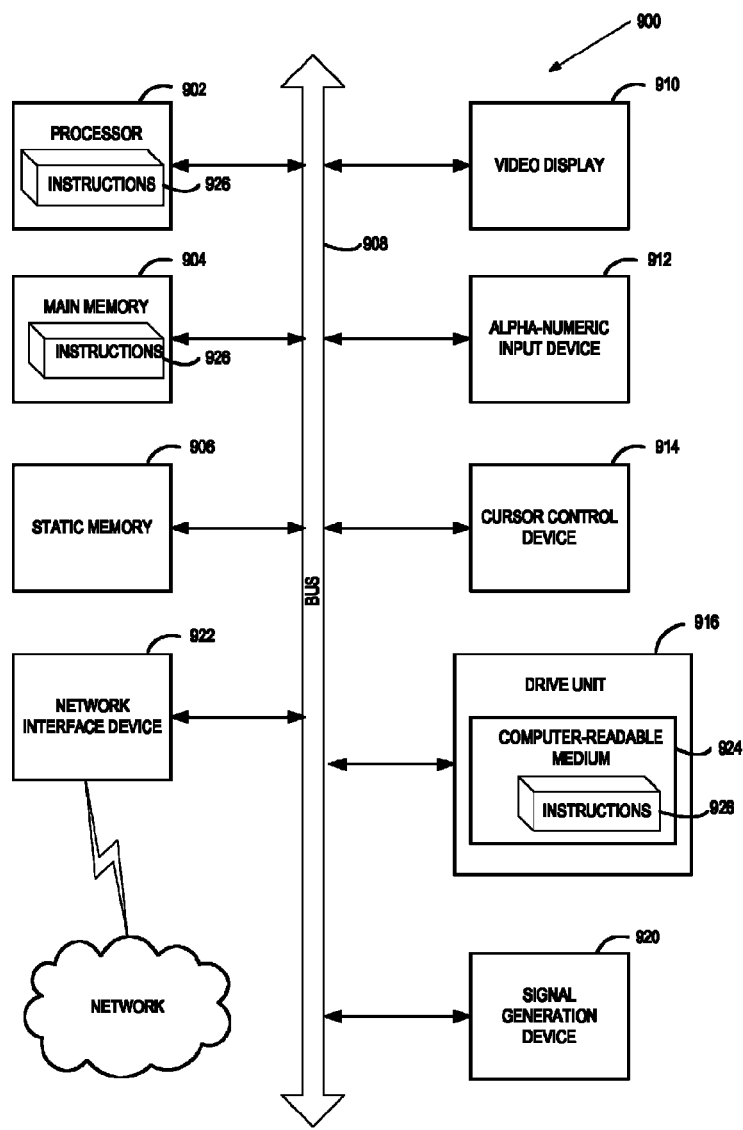
FIG. 9 illustrates a diagrammatic representation of a machine in the exemplary form of a computer system.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-accessible storage medium 930 on which is stored one or more sets of instructions (e.g., software 922) embodying any one or more of the methodologies or functions described herein. The software 922 may also reside, completely or at least partially, within the main memory 904 and/or within the processor 902 during execution thereof by the computer system 900, the main memory 904 and the processor 902 also constituting machine-accessible storage media. The software 922 may further be transmitted or received over a network 920 via the network interface device 908.

While the machine-accessible storage medium 930 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A computer-implemented method, comprising:
receiving, by a processing device executing an identification engine, user identification data extracted from an electronic communication, the user identification data corresponding to an unknown identity of a sender of the electronic communication;
determining, by the processing device, a known identity for the sender using the user identification data extracted from the electronic communication;
associating, by the processing device, the known identity with the unknown identity of the sender of the electronic communication, an association between the known identity and the unknown identity being maintained to determine whether parties of subsequent information transfers are authorized to participate in the information transfers;
determining a measure of correlation strength for the association between the known identity and the unknown identity based on at least one of how often the association is detected and how many times the association has been detected, wherein the correlation strength is maintained with the association; and
transmitting the known identity as the sender of the electronic communication and the measure of correlation strength to a communications data monitoring system to monitor information content to detect policy violation incidents.

2. The method of claim 1, further comprising:
receiving identification data extracted from a user endpoint device that is transmitting the electronic communication;
determining the known identity from the identification data extracted from the user endpoint device;
creating a correlation between the known identity and the user identification data extracted from the electronic communication; and
storing the correlation in a database.

3. The method of claim 1, further comprising:
updating the correlation strength based on at least one of how often the association is detected or how many times the association has been detected.

4. The method of claim 2, wherein the user endpoint device is selected from a group consisting of a personal digital assistant, cellular telephone, laptop computer, or personal computer.

5. The method of claim 1, wherein:
the electronic communication is in a format type selected from a group consisting of an electronic mail message, an instant message, or a text message; and
the user identification information extracted from the electronic communication is selected from a group consisting of an electronic mail address, an instant message handle, an internet protocol (IP) address from which the electronic communication was sent, or an online social network identification.

6. The method of claim 1, wherein the known identity is derived from a corporate directory system.

7. The method of claim 1, further comprising:
responding to a request for an identity report with the known identity, the identity report for determining whether an information transfer associated with the known identity is authorized in accordance with a data loss prevention policy.

8. A system comprising:
a memory and a processing device coupled to the memory, wherein the processing device is configured to execute an identification data receipt engine and an identification correlation engine;
the identification data receipt engine, configured to receive user identification data extracted from an electronic communication, the user identification data corresponding to an unknown identity of a sender of the electronic communication; and
the identification correlation engine, configured to:
determine a known identity for the sender using the user identification data extracted from the electronic communication;
associate the known identity with the unknown identity of the sender of the electronic communication, an association between the known identity and the unknown identity being maintained to determine whether parties of subsequent information transfers are authorized to participate in the information transfers;
determine a measure of correlation strength for the association between the known identity and the unknown identity based on at least one of how often the association is detected and how many times the association has been detected, wherein the correlation strength is maintained with the association; and
transmit the known identity as the sender of the electronic communication and the measure of correlation strength to a communications data monitoring system to monitor information content to detect policy violation incidents.

9. The system of claim 8, further comprising:
the identification data receipt engine to receive identification data extracted from a user endpoint device that is transmitting the electronic communication;
the identification correlation engine to determine the known identity from the identification data extracted from the user endpoint device and create a correlation between the known identity and the user identification data extracted from the electronic communication; and
a database to store the correlation.

10. The system of claim 8, further comprising:
the identification correlation engine to update the correlation strength based on at least one of how often the association is detected or how many times the association has been detected.

11. The system of claim 9, wherein the user endpoint device is selected from a group consisting of a personal digital assistant, cellular telephone, laptop computer, or personal computer.

12. The system of claim 8, wherein:
the electronic communication is in a format type selected from a group consisting of an electronic mail message, an instant message, or a text message; and
the user identification information extracted from the electronic communication is selected form a group consisting of an electronic mail address, an instant message handle, an internet protocol (IP) address from which the electronic communication was sent, or an online social network identification.

13. The system of claim 8, wherein the known identity is derived from a corporate directory system.

14. The system of claim 8, further comprising:
a reporting engine, to be executed by the processing device, to respond to a request for an identity report with the known identity, the identity report for determining whether an information transfer associated with the known identity is authorized in accordance with a data loss prevention policy.

15. A non-transitory computer readable storage medium that provides instructions, which when executed on a processing device, cause the processing device to perform a method comprising:
receiving, by the processing device, user identification data extracted from an electronic communication, the user identification data corresponding to an unknown identity of a sender of the electronic communication;
determining, by the processing device, a known identity for the sender using the user identification data extracted from the electronic communication;
associating, by the processing device, the known identity with the unknown identity of the sender of the electronic communication, an association between the known identity and the unknown identity being maintained to determine whether parties of subsequent information transfers are authorized to participate in the information transfers;
determining a measure of correlation strength for the association between the known identity and the unknown identity based on at least one of how often the association is detected and how many times the association has been detected, wherein the correlation strength is maintained with the association; and
transmitting the known identity as the sender of the electronic communication and the measure of correlation strength to a communications data monitoring system to monitor information content to detect policy violation incidents.

16. The non-transitory computer readable storage medium of claim 15, further comprising:
receiving identification data extracted from a user endpoint device that is transmitting the electronic communication;
determining the known identity from the identification data extracted from the user endpoint device;
creating a correlation between the known identity and the user identification data extracted from the electronic communication; and
storing the correlation in a database.

17. The non-transitory computer readable storage medium of claim 15, further comprising:
  updating the correlation strength based on at least one of how often the association is detected or how many times the association has been detected.

\* \* \* \* \*

UNITED STATES PATENT AND TRADEMARK OFFICE
CERTIFICATE OF CORRECTION

| | | |
|---|---|---|
| PATENT NO. | : 8,935,752 B1 | Page 1 of 1 |
| APPLICATION NO. | : 12/409449 | |
| DATED | : January 13, 2015 | |
| INVENTOR(S) | : Shun Chen et al. | |

It is certified that error appears in the above-identified patent and that said Letters Patent is hereby corrected as shown below:

In the Claims

In claim 12, column 16, line 15, delete "form" and insert --from--

Signed and Sealed this
First Day of September, 2015

Michelle K. Lee
*Director of the United States Patent and Trademark Office*